(12) United States Patent
Wolf et al.

(10) Patent No.: US 11,766,998 B2
(45) Date of Patent: Sep. 26, 2023

(54) VEHICLE GUIDING ATTACHMENT

(71) Applicants: VOLKSWAGEN AKTIENGESELLSCHAFT, Wolfsburg (DE); PORSCHE AG, Stuttgart (DE)

(72) Inventors: Joerg Christian Wolf, Foster City, CA (US); Elnaz Vahedforough, San Jose, CA (US); James Phan Bui, Redwood City, CA (US); Bryan Grant, Palo Alto, CA (US); Martin Fest, Redwood City, CA (US); Nikhil George, Palo Alto, CA (US)

(73) Assignees: VOLKSWAGEN AKTIENGESELLSCHAFT, Wolfsburg (DE); PORSCHE AG, Stuttgart (DE)

( * ) Notice: Subject to any disclaimer, the term of this patent is extended or adjusted under 35 U.S.C. 154(b) by 741 days.

(21) Appl. No.: 16/530,168

(22) Filed: Aug. 2, 2019

(65) Prior Publication Data
US 2021/0031734 A1    Feb. 4, 2021

(51) Int. Cl.
| | |
|---|---|
| B60S 13/00 | (2006.01) |
| G01S 7/481 | (2006.01) |
| B62D 65/18 | (2006.01) |
| G01S 17/931 | (2020.01) |

(52) U.S. Cl.
CPC .............. *B60S 13/00* (2013.01); *B62D 65/18* (2013.01); *G01S 7/481* (2013.01); *G01S 17/931* (2020.01)

(58) Field of Classification Search
CPC ......... B60S 13/00; B62D 65/18; G01S 17/87; G01S 17/931; G01S 7/481
See application file for complete search history.

(56) References Cited

U.S. PATENT DOCUMENTS

| | | | | |
|---|---|---|---|---|
| 5,988,306 A | * | 11/1999 | Ooishi | G05D 1/0263 180/24.02 |
| 6,971,464 B2 | * | 12/2005 | Marino | G05D 1/0263 180/167 |
| 2003/0051311 A1 | * | 3/2003 | Reilly | B60B 33/0073 16/44 |

(Continued)

FOREIGN PATENT DOCUMENTS

| | | | | |
|---|---|---|---|---|
| DE | 102012016519 | * | 2/2014 | .............. B62D 65/18 |
| DE | 102012016519 A1 | | 2/2014 | |

OTHER PUBLICATIONS

English translation of DE 102012016519, Feb. 2014.*

*Primary Examiner* — Mohammed S Rahaman
(74) *Attorney, Agent, or Firm* — Shield Intellectual Property PC; Kirk D. Wong

(57) ABSTRACT

A vehicle attachment for guiding a vehicle includes a magnetic tape sensor, at least one sensor, a controller, at least one coupling device for attachment to the vehicle, and a vehicle interface system. The magnetic tape sensor is configured to detect a path. The at least one sensor can detect whether there are any obstructions along the path. The controller is configured to steer the vehicle along the predefined path and to adjust the speed of the vehicle to avoid coming in contact with any obstructions. The vehicle interface system is configured to communicatively couple the controller to at least one electronic control unit of the vehicle.

18 Claims, 7 Drawing Sheets

(56) References Cited

U.S. PATENT DOCUMENTS

| | | | |
|---|---|---|---|
| 2008/0246254 A1* | 10/2008 | Tyerman | B60D 1/36 |
| | | | 280/477 |
| 2016/0274589 A1* | 9/2016 | Templeton | G05D 1/0246 |
| 2017/0025019 A1* | 1/2017 | Pink | G01S 17/931 |
| 2018/0142488 A1* | 5/2018 | Boussard | E04H 6/182 |
| 2018/0232770 A1* | 8/2018 | Miller | G06V 20/593 |
| 2019/0361461 A1* | 11/2019 | Kobayashi | G05D 1/0263 |
| 2020/0103908 A1* | 4/2020 | Chen | G05D 1/0214 |
| 2020/0183371 A1* | 6/2020 | Park | G05D 1/0016 |

* cited by examiner

VEHICLE GUIDING ATTACHMENT

CROSS-REFERENCE TO RELATED APPLICATIONS

None.

FIELD

The present disclosure relates to methods, apparatuses, and systems for a vehicle guiding attachment and, more particularly, to a vehicle attachment to guide an attached vehicle autonomously.

BACKGROUND

During the production process, a vehicle is usually transported by a conveyor belt through a number of stations for installation of components to the vehicle and for inspection. Such conveyor belt is expensive, typically costing thousands of dollars per meter to install. Once installed, the conveyor belt is not reconfigurable. If there are any changes to the manufacturing process, the new manufacturing process must be designed to fit the existing conveyor belt layout.

It may be possible to use built-in sensors of a vehicle to autonomously steer the vehicle through a factory. However, such systems require that these vehicles be fully equipped with an array of sensors needed for autonomous drive capability in a dense factory environment with people. Current vehicles do not have such sensors or lack the required field-of-view. Even if a vehicle was equipped with such sensors, the vehicle would not be able to steer itself during an early phase of production since the drive train and autonomous driving sensors may not be operational at that time. Also the sensor suit is different from one vehicle brand or model to another, making it almost impossible to use the same driving software across all. In other words, with any sensor change the vehicle driving software needs to get revised, resulting in unnecessary costs.

FIG. 1 illustrates a diagram of a prior art device for carrying a vehicle during the production process. An autonomous guided vehicle ("AGV") 8 comprises a front block 10, a telescopic arm 12, and extensions 14 and 16 coupled to the arm 12 for contacting the wheels of a vehicle 6. The front block 10 has a motor and wheels to propel the AGV 8 and a computing system for handling autonomous guidance of the AGV 8. The extensions 14 and 16 raise the car off the ground so that the AGV 8 can tow the vehicle 6 from one station to the next station.

The disadvantages of the AGV 8 are as follows. First, the AGV 8 is costly to manufacturer since it requires its own powertrain that is robust enough to carry a vehicle as its payload. Second and as a corollary to the first, the AGV 8 is not scalable for vehicle mass production since a fleet of such AGVs would be prohibitively expensive to manufacture and deploy. The AGV designs that include its own powertrain and batteries tend to be large and prevent the factory workers and robots to access the vehicle from all sides.

Therefore, it is desirable to develop new methods, systems, and apparatuses that can leverage the systems of a vehicle to be guided through the various manufacturing stations during the production process of that vehicle.

BRIEF DESCRIPTION OF THE FIGURES

Illustrative embodiments of the present disclosure are described in detail below with reference to the following drawing figures.

DETAILED DESCRIPTION OF THE EMBODIMENTS

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill in the art may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Figure 1:
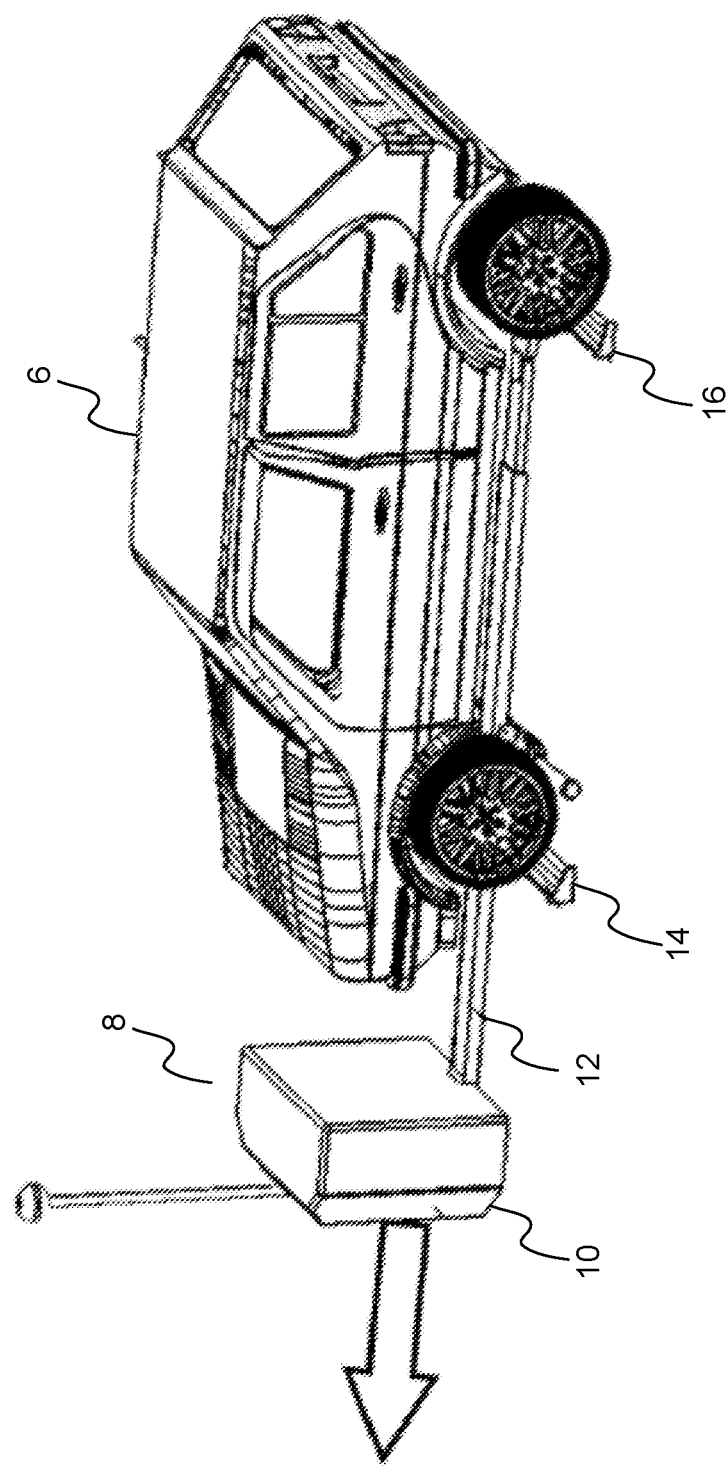
FIG. 1 illustrates a diagram of a prior art AGV for carrying a vehicle during the production process.
Figure 2:
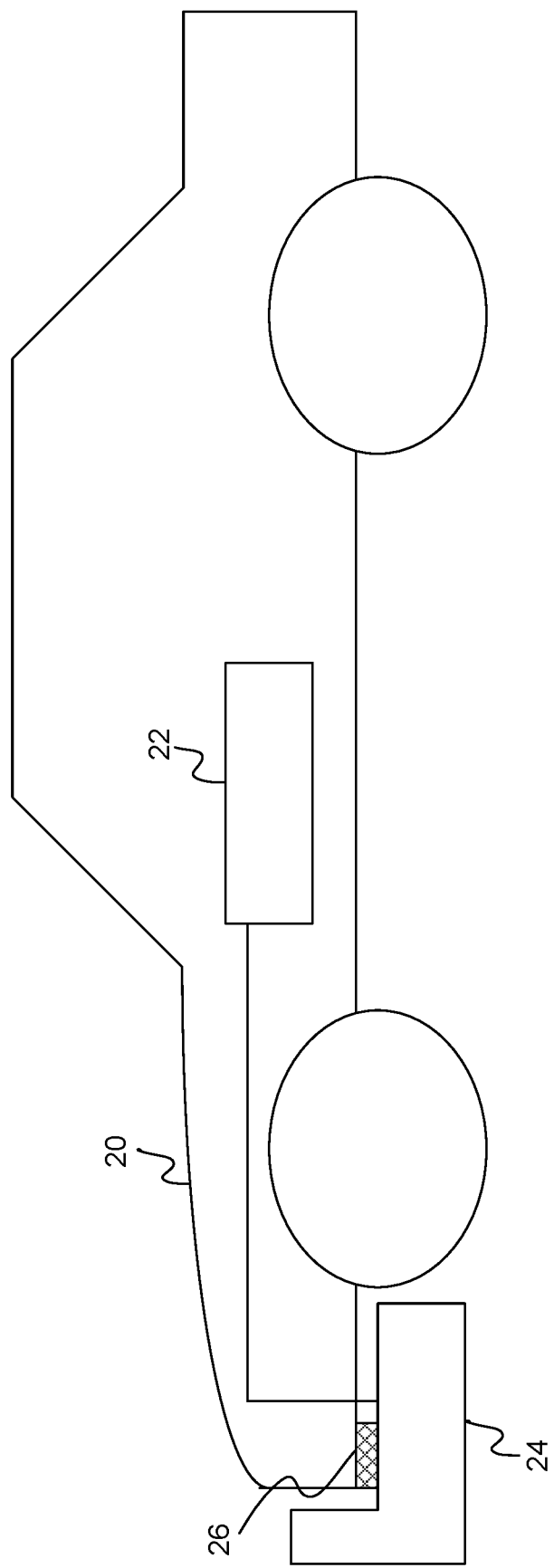
FIG. 2 illustrates a side-view diagram of an embodiment of a vehicle attachment of the present disclosure for guiding a vehicle.

FIG. 2 illustrates a side-view diagram of an embodiment of a vehicle attachment of the present disclosure for guiding a vehicle. In at least one embodiment, a vehicle attachment 24 is communicatively coupled to a vehicle 20. In particular, the vehicle attachment 24 is coupled to an electronic control unit ("ECU") 22 for propulsion, braking, and steering. In other embodiments, it can be appreciated that there can be multiple ECUs, where each controls a particular function of the vehicle or multiple functions of the vehicle. For instance, an ECU can be assigned to control the propulsion system of the vehicle; another ECU can be assigned to control the braking system of the vehicle; and yet another ECU can be assigned to control the steering system of the vehicle. The present disclosure can be understood to cover such variations and/or combinations of ECUs. The communicative coupling may be implemented with a dedicated interface for autonomous control. Alternatively, for older vehicles and/or vehicles without such interface, it may be implemented in form of manipulation and imitation of communication between ECUs, e.g., using cruise control messages and/or power steering related messages. Thus, this can eliminate the need for a design change to the vehicle to implement the present disclosure described herein.

In an embodiment, the vehicle 20 can have an autonomous drive system. The vehicle attachment 24 can be coupled to the autonomous drive system to tune and extend such onboard system of the vehicle to work within a confined space, such as a manufacturing plant.

The vehicle attachment 24 is attached to the vehicle 20 via a coupling device 26.

In an embodiment, the coupling device 26 can be one or more suction cups for adhering to a portion of the vehicle 20. In another embodiment, the coupling device 26 can be one or more magnets for adhering to a metallic portion of the vehicle 20. In yet another embodiment, the coupling device 26 can be one or more latches for latching to one or more receivers of the vehicle 20. In a further embodiment, the coupling device 26 can be one or more receivers configured to be latched to one or more latches of the vehicle. It can be appreciated that other coupling devices can be used in conjunction with the present disclosure. Furthermore, combinations of the aforementioned coupling devices are also within the scope of the present disclosure.

In terms of positioning, the vehicle attachment 24 can be positioned near the front of the vehicle 20. The vehicle attachment 24 may have one or more sensors (e.g., a magnetic tape sensor and/or LIDARs) to detect a predefined path for the vehicle 20 to take and to determine if there are any objects obstructing such predefined path. By positioning the vehicle attachment 24 at or near the front, the vehicle attachment 24 can scan the area in front of the vehicle 20 and to the sides of the vehicle 20. Furthermore, the vehicle attachment 24 is shown to be located underneath the vehicle 20. However, it can be appreciated that other locations can be possible in view of the present disclosure, including directly in front of the attached vehicle 20, behind the attached vehicle 20, and/or virtually anywhere by simply moving the mounting points to the vehicle 20.

Figure 3:
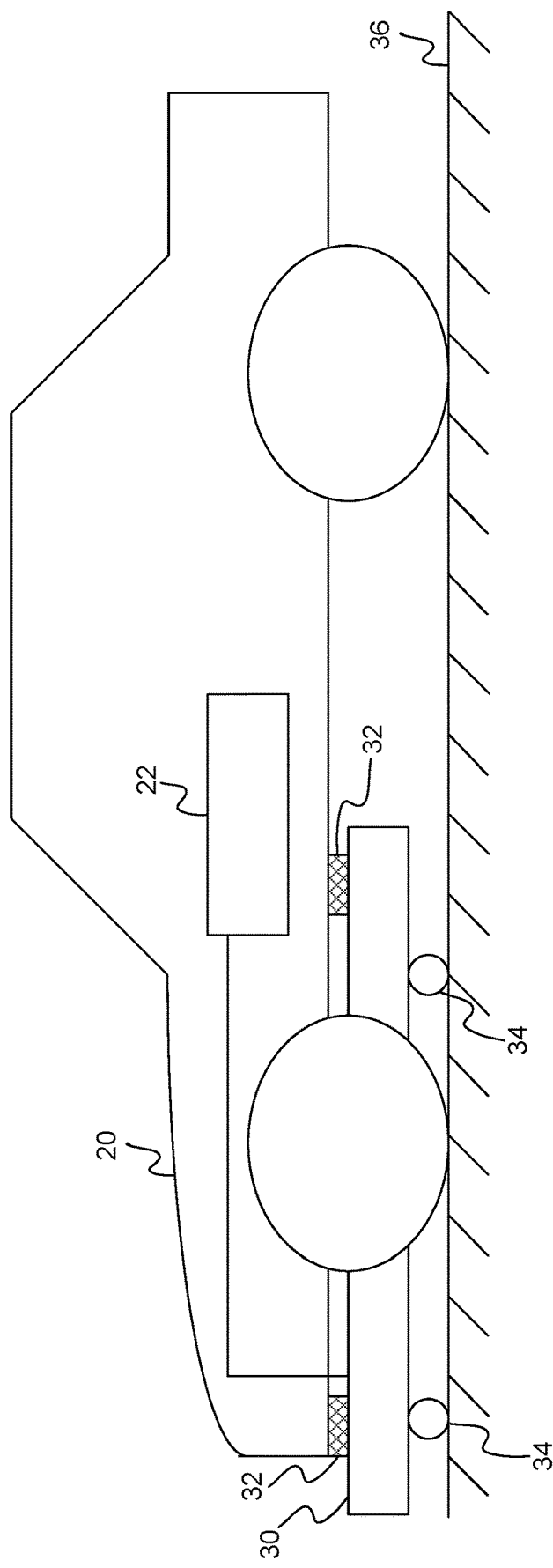
FIG. 3 illustrates a side-view diagram of another embodiment of a vehicle attachment of the present disclosure for guiding a vehicle.

FIG. 3 illustrates a side-view diagram of another embodiment of a vehicle attachment of the present disclosure for guiding a vehicle. A vehicle attachment 30 can have multiple coupling devices 32 to couple to various points of the vehicle 20. The vehicle attachment 30 further comprises one or more wheels 34 to maintain one or more sensors of the vehicle attachment 30 at a predefined distant from a ground 36.

The coupling devices 32 can be coupled to the front of the vehicle and near the middle of the vehicle. The vehicle attachment 30 can have sensors situated at the front and its side to detect for any obstructions near the sides of the vehicle 20.

The vehicle attachment 30 is communicatively coupled to the ECU 22 of the vehicle 20 to control the vehicle 20's powertrain. The vehicle attachment 30 can provide commands to drive the vehicle 20 autonomously. For instance, the vehicle attachment 30 can sense a predefined path and detect any obstacles along that predefined path. The vehicle attachment 30 uses this information to provide acceleration, steering, and/or braking information to the vehicle 20 via the ECU 22 to follow the predefined path.

In an embodiment, the vehicle attachment 30 can have a magnetic tape sensor which detects a magnetic strip on the ground. The magnetic tape sensor is coupled to a controller of the vehicle attachment 30 to read the sensor. Based on sensor data and current steering angle read from the vehicle controller area network ("CAN") bus, the controller provides steering command to the vehicle 20 to adjust the vehicle 20's direction. The steering command can be sent to the steering-ECU via a CAN bus of the vehicle 20.

The one or more wheels 34 can be castors that follow along to the moving vehicle 20. The casters can be used to keep the sensors at a fixed height relative to the ground while allowing the frame of the vehicle attachment 30 to be attached to the vehicle 20 via the coupling devices 32. This would be specifically useful in a production line where people might need to go into the car, causing vertical displacement of the attached structure. The proposed castors can assure that the sensor(s) stays within a required distance from the plant floor.

The vehicle attachment 30 can contain a plurality of LIDARs for detecting obstacles in the path of the vehicle 20. The vehicle 20 can stop if one of the LIDARs measure an obstacle within the predefined path. In an embodiment, two single beam LIDARs can be used, where one LIDAR is used to detect obstacles in a horizontal plane just above the ground and another LIDAR is pitched relative to the first to detect obstacles that are higher up from the ground. In order to provide a cost effective solution, a single beam LIDAR can be chosen. However, the single beam LIDAR would be positioned at a predetermined angle to detect objects on the plant floor and objects in the vehicle path.

In an embodiment, the one or more wheels 34 may be driven by an onboard powertrain on the vehicle attachment 30. The vehicle attachment 30 can be attached to the vehicle 20 to tow the vehicle using the onboard powertrain of the vehicle attachment 30. For such configuration, coupling devices 32 of the vehicle attachment 30 can be attached to the frame of the vehicle 20 during towing.

In an embodiment, the vehicle attachment 30 can further comprise a suspension system positioned between the frame of the vehicle attachment 30 and mounting points to the vehicle 20. The suspension system can horizontally center the frame of the vehicle attachment 30 between the mounting points. The suspension system can also further absorb sudden impacts caused by the ground (e.g., bumps on the ground or otherwise uneven areas of the ground as the vehicle 20 traverses the ground) and by internal movement within the vehicle 20 (e.g., occupants entering and leaving the vehicle, unloading and loading luggage and/or equipment, etc.).

Figure 4:
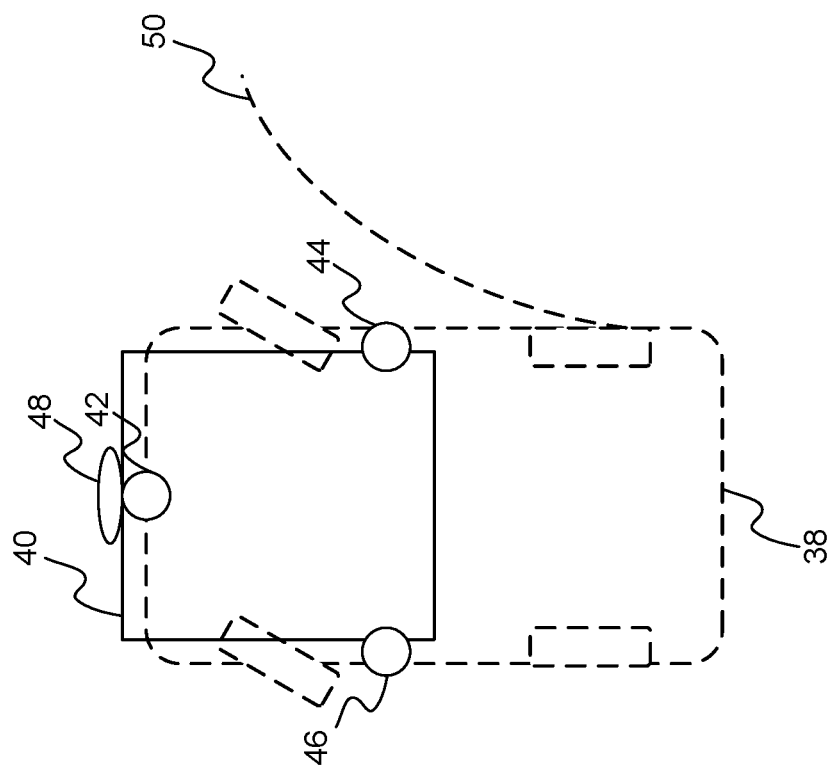
FIG. 4 illustrates a top-view diagram of a vehicle and a vehicle attachment of the present disclosure for steering around a corner.

FIG. 4 illustrates a top-view diagram of a vehicle and an embodiment of a vehicle attachment of the present disclosure for steering around a corner. In an embodiment, a vehicle 38 can be guided along a path 50 by a vehicle attachment 40. The vehicle attachment 40 can have a plurality of LIDARs 42, 44, 46, and 48.

The LIDARs 42 and 48 are disposed at the front of the vehicle to detect obstructions ahead of the front area of the vehicle 38. The LIDAR 48 can look for any obstructions along the ground level and the LIDAR 42 can have a detection range that is pitched relative to the LIDAR 48's detection plane to detect obstructions above the ground level. Alternatively, LIDAR 42, 44, and 46 may be multi-beam LIDARs that cover a wide field-of-view horizontally and vertically. The LIDAR 44 is disposed on the right side of the vehicle 38 to detect any obstructions on the right side of the vehicle 38. Similarly, the LIDAR 46 is disposed on the left side of the vehicle 38 to detect any obstructions on the left side of the vehicle 38.

The LIDARs 44 and 46 provide for a wide range of obstruction detection that extend beyond a vehicle's sensor capabilities. For instance, the vehicle 38 may have a LIDAR sensor aimed to detect objects meters away from the vehicle. Such LIDAR configuration are not tuned to detect obstacles at the immediate periphery of the vehicle. In a confined environment, the sensitivity of the LIDARs need to be tuned to be able to detect obstructions that can be within inches of the body or wheels of the vehicle. Therefore, there is a need to orient the LIDAR sensors of the vehicle attachment 40 to detect for such obstructions.

For instance, the LIDAR sensor 44 can detect for obstructions along the curved path 50. The controller of the vehicle attachment 40 can issue a command to stop the vehicle to avoid a collision with any detected obstruction. Alternatively, the vehicle attachment 40 can issue a command to steer around the obstruction to avoid a collision. It can be appreciated that other types of sensors can be used in lieu of and/or in combination with one or more LIDARs, including an image sensor, a RADAR, an infrared sensor, etc. In an embodiment where the LIDAR does not cover the full field-of-view to the side (space between vehicle and curved path 50) when turning, it requires a memory to remember if the space was free without obstacles when passing by with the front LIDARs. This memory may be implemented in form of an occupancy grid or related.

Figure 5:
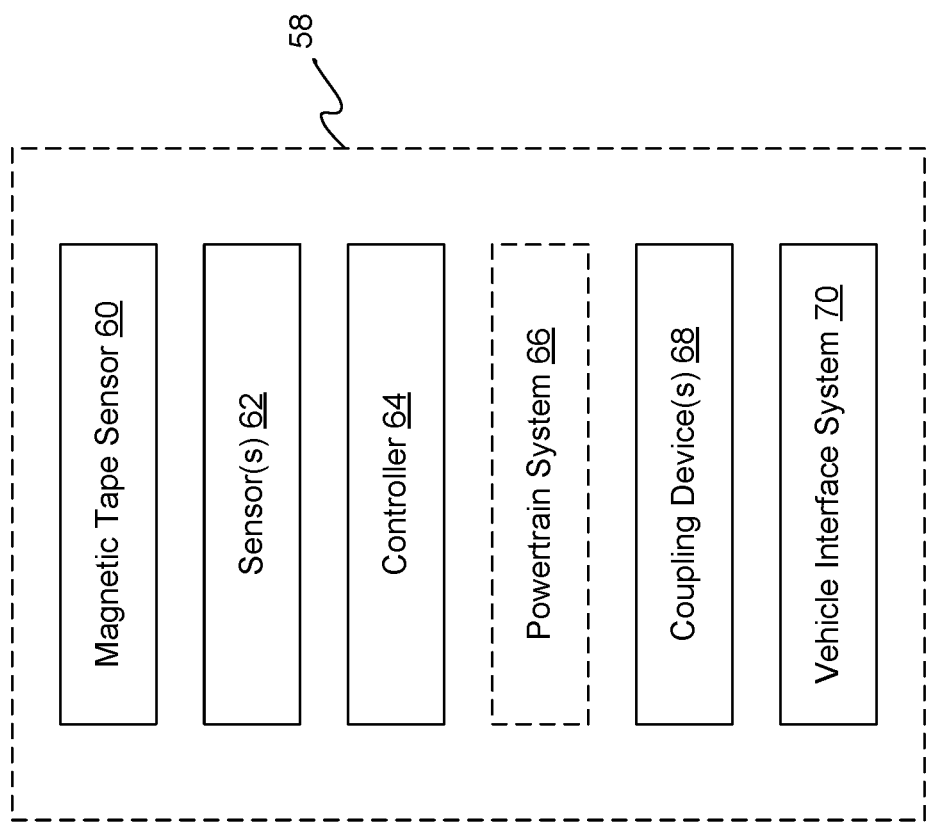
FIG. 5 illustrates a block diagram of components of an embodiment of a vehicle attachment of the present disclosure.

FIG. 5 illustrates a block diagram of the components of an embodiment of a vehicle attachment of the present disclosure. A vehicle attachment 58 for guiding a vehicle comprises a magnetic tape sensor 60 for detecting a predefined path, at least one sensor 62 for detecting obstructions along the detected path, a controller 64 configured to provide commands to drive the vehicle along the predefined path, at least one coupling device 68 for attachment to the vehicle, and a vehicle interface system 70 for coupling the controller 64 to at least one electronic control unit of the vehicle.

The vehicle attachment 58 may, optionally, further comprise a powertrain system 66. The vehicle attachment 58 may include at least one wheel that is steered and driven by the powertrain system 66. The at least one wheel can be distanced from the ground to maintain the magnetic tape sensor a predefined distance from the ground. In another embodiment, the vehicle attachment 58 may not have any powertrain system 66 and can be pulled or pushed along by the attached vehicle's powertrain.

The magnetic sensor 40 is positioned in approximation of the magnetic tape that is laid on the ground. This tape indicates the predefined path on which the vehicle will drive autonomously. The magnetic sensor 40 measures the distance from center of the tape and provides the sensed data to the lateral controller 44. The controller 44 can then provide commands to the attached vehicle to follow the predefined path.

The magnetic tape sensor 40 can also be used to indicate when the vehicle attachment and the attached vehicle should stop for a length of time. For instance in a vehicle manufacturing plant, each vehicle manufactured stops or slowly creeps pass various stations along an assembly line for installation of various components to the vehicle. If there's an issue with the vehicle that needs attention, the vehicle attachment 58 may need to guide the vehicle off the assembly line to a nearby space, so as to not block any other vehicles on the assembly line. The magnetic tape used for the predefined path can indicate such scenarios in a variety of manners. The sensed magnetism may vary in a predefined way to indicate a stop for a predefined amount of time and/or for a particular speed of the vehicle. Furthermore, the vehicle attachment 58 can be wirelessly commanded to guide the vehicle to a particular defined area to prevent it from obstructing any other cars along the predefined path.

The vehicle should be at least equipped with one or more LIDARs. In an embodiment, a single multi-beam LIDAR can be used to scan the immediate periphery around the vehicle for any obstructions. In another embodiment, a plurality of LIDARs can be used by the vehicle attachment 58 to detect any obstructions along the floor level in the front of the vehicle, above the floor level, and to the sides of the vehicle.

The controller 64 can be a computing system configured to transmit data to, receive data from, process data, interact with, control one or more sensors of the vehicle attachment 58 and/or sensors of the vehicle, and/or control systems within the vehicle attachment 58 and/or within the attached vehicle. The computing system can be communicatively coupled to the magnetic tape sensor 60, at least one sensor 62 and/or sensors of the attached vehicle, a powertrain system 66, a power supply (not shown), and a vehicle interface system 70 via a system bus. In an embodiment, a wireless network (e.g., via a vehicle-to-vehicle, vehicle-to-infrastructure, vehicle-to-device, and so on) can be used to communicatively couple the vehicle attachment to the attached vehicle rather than have any physical cable connections. The communication to the vehicle may be used to instruct the vehicles to follow a specific path when the magnetic tape splits into multiple paths from a central coordinating server.

In at least one embodiment, the computing system may be configured to store data in a local data storage (not shown) and/or communicatively coupled to an external data storage (not shown). It can be appreciated that the data can also be transmitted to a cloud service and received from the cloud service via over-the-air ("OTA") wireless techniques. For instance, OTA wireless technique can be used to transmit updated DNN models, software updates or to upload interesting data such as corner cases.

In another embodiment, the computing system may be configured to capture data of the surrounding environment of the vehicle. In yet another embodiment, the computing system may control operation of the drivetrain system to autonomously or semi-autonomously guide and/or operate the attached vehicle. As yet another example, the computing system may be configured to store and execute instructions corresponding to an algorithm (e.g., for steering, braking, and/or throttling) for the ECUs of the attached vehicle. In another example, the computing system may be configured to store and execute instructions for determining the environment around the vehicle using the sensors of the vehicle. These are just a few examples of the many possible configurations of the computing system.

The computing system can include one or more processors (not shown). Furthermore, the computing system can have its own data storage (not shown) and/or use an external data storage. The one or more processors may comprise one or more general-purpose processors and/or one or more special-purpose processors. To the extent the processor includes more than one processor, such processors could work separately or in combination. Data storage of the computing system, in turn, may comprise one or more volatile and/or one or more non-volatile storage components, such as optical, magnetic, and/or organic storage. The data storage may be integrated in whole or in part with the one or more processors of the computing system and may be communicatively coupled to the data storage. In some embodiments, data storage of the computing system may contain instructions (e.g., program logic) executable by the processor of the computing system to execute various vehicle functions (e.g., the methods disclosed herein).

The term computing system may refer to data processing hardware, e.g., a CPU and/or GPU, and encompasses all kinds of apparatus, devices, and machines for processing data, including by way of example a programmable processor, a computer, multiple processors, computers, cloud computing, and/or embedded low-power devices (e.g., a microcontroller or a NVidia Drive PX2). The system can also be, or further include, special purpose logic circuitry, e.g., an FPGA (field programmable gate array) or an ASIC (application-specific integrated circuit). The system can optionally include, in addition to hardware, code that creates an execution environment for computer programs, e.g., code that constitutes processor firmware, a protocol stack, a database management system, an operating system, or a combination of one or more of them. A computer program can also be used to emulate the computing system.

A computer program which may also be referred to or described as a program, (software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not need to correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

The coupling device(s) 68 can be one or more suction cups for adhering to a portion of the vehicle. In at least one embodiment, the coupling device 26 is one or more magnets for adhering to a metallic portion of the vehicle. In at least one embodiment, the coupling device 26 is one or more latches for latching to one or more receivers of the vehicle. In at least one embodiment, the coupling device 26 is one or more receivers configured to be latched by one or more latches of the vehicle. In yet another embodiment, a combination of coupling devices can be used in combination.

In an embodiment, the vehicle interface system 70 can be a data transmission cable. The data transmission cable communicatively couples the controller 64 with one or more electronic control units of the attached vehicle. The cable can have a connector to be received by a connector to the ECU(s) of the attached vehicle.

In another embodiment, the vehicle interface system 70 can be a wireless communications device. The wireless communications device is configured to communicatively couple the controller 64 with one or more electronic control units of the attached vehicle. For instance, the wireless communications device can communicate with a vehicle via a vehicle-to-everything ("V2X") communications protocol. In yet another embodiment, the vehicle interface system 70 can comprise a combination of cabled and wireless communications.

The vehicle attachment 58 can optionally have a powertrain system 66 to power a one or more wheels for propelling the vehicle attachment 58. The vehicle attachment 58 can autonomously search for a vehicle and attach itself to that vehicle using its powertrain system 66 for positioning the vehicle attachment 58 on the mounting points of the vehicle. Once attached, the vehicle attachment 58 can use its powertrain system 66 for driving the vehicle attachment and the attached vehicle along the predefined path. In addition, the powertrain system 66 can be deactivated and the controller 64 can operate the attached vehicle powertrain to follow the predefined path.

Figure 6:
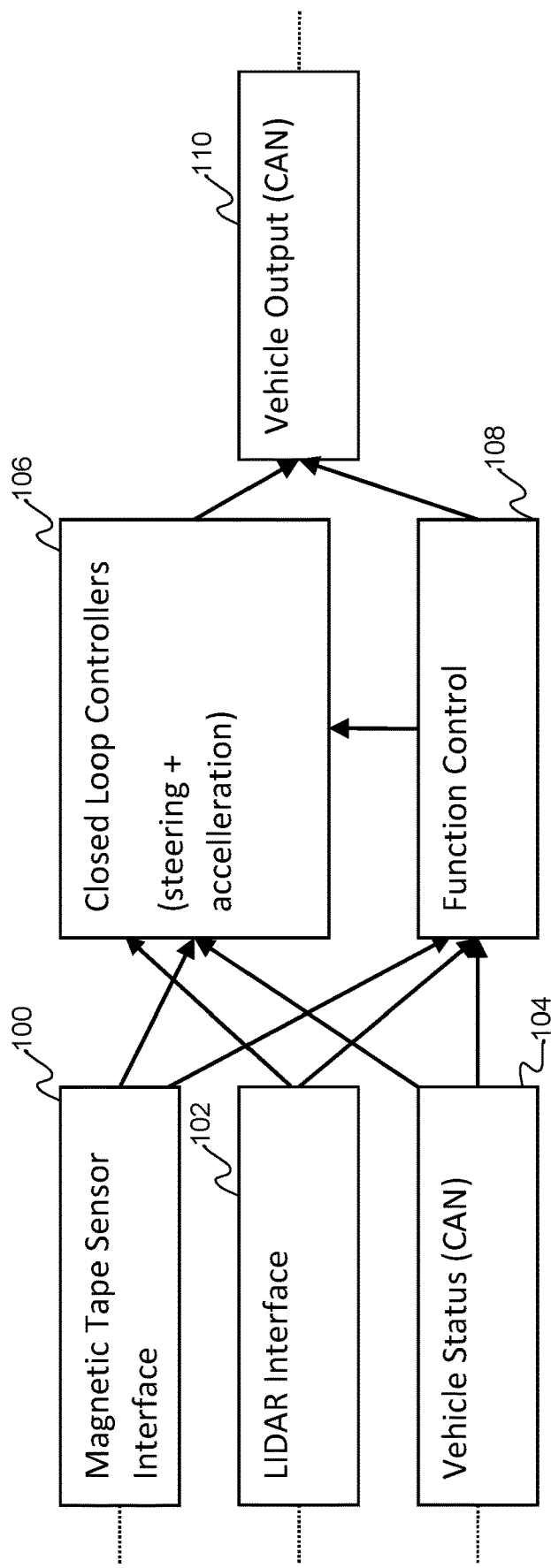
FIG. 6 illustrates a data flow diagram of an embodiment of a vehicle attachment of the present disclosure for guiding a vehicle.

FIG. 6 illustrates a data flow diagram of an embodiment of a vehicle attachment of the present disclosure for guiding a vehicle. A magnetic tape sensor interface 100 of the vehicle attachment supplies the position of the magnetic tape (i.e., lateral offset from center of the vehicle) to closed loop controllers 106. The closed loop controllers 106 can adjust the steering angle accordingly via the vehicle output CAN 110 to keep the attached vehicle on the predefined path for lateral control. For longitudinal control, the speed and acceleration of the attached vehicle is checked by retrieving CAN messages. The acceleration can be adjusted to keep the speed constant and at a low rate.

In a factory, the speed of a vehicle can be very slow. For instance, when the vehicle is worked on, the speed can be extremely slow (e.g., a few centimeters per second) mimicking a conveyor belt. The speed may go up to a walking speed when the vehicle travels to another station. A function control unit 108 can set the vehicle to the right mode for autonomous driving and/or for guiding by the vehicle attachment. The function control unit 108 controls the autonomous system's activation and deactivation. It can receive the activation command from a digital button on the vehicle or a wireless command and activate or deactivate the system after checking the health of the system. It also can receive commands from vehicle brake and gas pedals as well as steering wheel torque to deactivate the autonomous driving. These methods of deactivation serves as redundant deactivation system in the vehicle. Such a function control unit can continuously check the vehicle status via a CAN 104 (e.g. whether engine is on, whether gear is in drive, etc.) and issue commands accordingly. Furthermore, the vehicle may communicate distance driven and current speed to the function control unit via CAN 104.

In case the LIDAR detects an obstacle, the LIDAR interface 102 provides a signal to the function control unit 108 of such detection. The function control unit 108 can further issue a brake command to the closed loop controllers 106. The closed loop controllers 106 and the function control unit 108 can be communicatively coupled to the vehicle output CAN. The perception command from LIDAR control unit can be communicated to closed loop controllers 106 as well as the function control unit 108. Therefore, the longitudinal closed loop control system issues a proper stopping deceleration control signal when an obstacle is detected on the vehicle path. This implementation provides an extra independent path to act promptly in case a malfunction occurs in the function control unit 108.

In above embodiments, the various components of a vehicle attachment are selected to fit a factory environment. However, the component selections can be generalized further to account for changes in the environment and/or the chosen time of use during production changes. For instance, for the path following system, a magnetic tape sensor can be selected due to its robust use within factories. However, other line following technologies can be used such as a reflective materials that can be imaged using cameras and/or photo transmitter/receptor pairs capable of detecting specific wavelengths of light. This can be regular color paint or a transparent material that is reflective at certain non-visible wavelengths. The LIDARs for a proximity detection system can also be expanded by replacement with a 2-axis LIDAR which can be used for path planning and proximity detection.

For the proximity detection system, LIDARs can be used because they are high resolution and typically one of the best options for distance sensing. However, there are other options for distance sensing such as ultrasonic sensors, inductive sensors, or other types of photo transmitter and receiver pairs. Additionally, the cost and accuracy of the current system could be decreased by removing one LIDAR and adding a rotating mechanism on the other LIDAR. This would enable one LIDAR to detect objects at many different angles in front of the car instead of only two. As stated in the path following system section, the two LIDAR system could be replaced by a 2-axis LIDAR, however, these are typical very expensive.

For the steering system, manipulating CAN messages can be a chosen method. However, steering can also be accomplished by adding an actuated steering mechanism to the vehicle attachment. Alternatively, if the stock steering mechanism is installed, a mechanical attachment mechanism can be used to directly control the wheels. Alternatively, a mechanical mechanism could be attached to the steering wheel and be used to physically rotate it. Additionally, if the vehicle attachment had its own propulsion system, it could lift the car and provide a swivel based turning mechanism, potentially increasing the turning radius of the system.

Additionally, manipulating CAN messages was the chosen method of providing braking. However, a braking mechanism could also be integrated into the sensor attachment. This could be something that increases the friction with the floor through the wheels or an additional appendage. In this case, it might also be necessary to remove power from the car, so that any unintended acceleration can be stopped as well.

For our chosen steering system, the steering messages are manipulated via the CAN network. However, the steering system in the future could be on a FlexRay, Ethernet, and/or even a custom communication network designed for this purpose.

Additionally, our proposed system includes a direct hardware connection to the car. However, of course this is not the only communication method. The vehicle attachment could communicate and manipulate messages via a wireless communication device such as WiFi, a mobile network interface, or a custom, security enabled interface designed for this purpose. With using a wireless protocol, a physical cable connection can be removed via an inductive and/or optical communication system by aligning a reader to an interface in the bumper or somewhere on the exterior. The mechanical attachment method may also ideally not require a human operator. The system could also have an imaging device that autonomously orients the attachment to the car and connects to car via the chosen connection method. Another option for the attachment system could be a strong electromagnet that enables and adheres to a magnetic area within the bumper. Many of the alternatives proposed would increase the cost of the device, however, these additional systems would enable the transportation of partially assembled vehicles.

Figure 7:
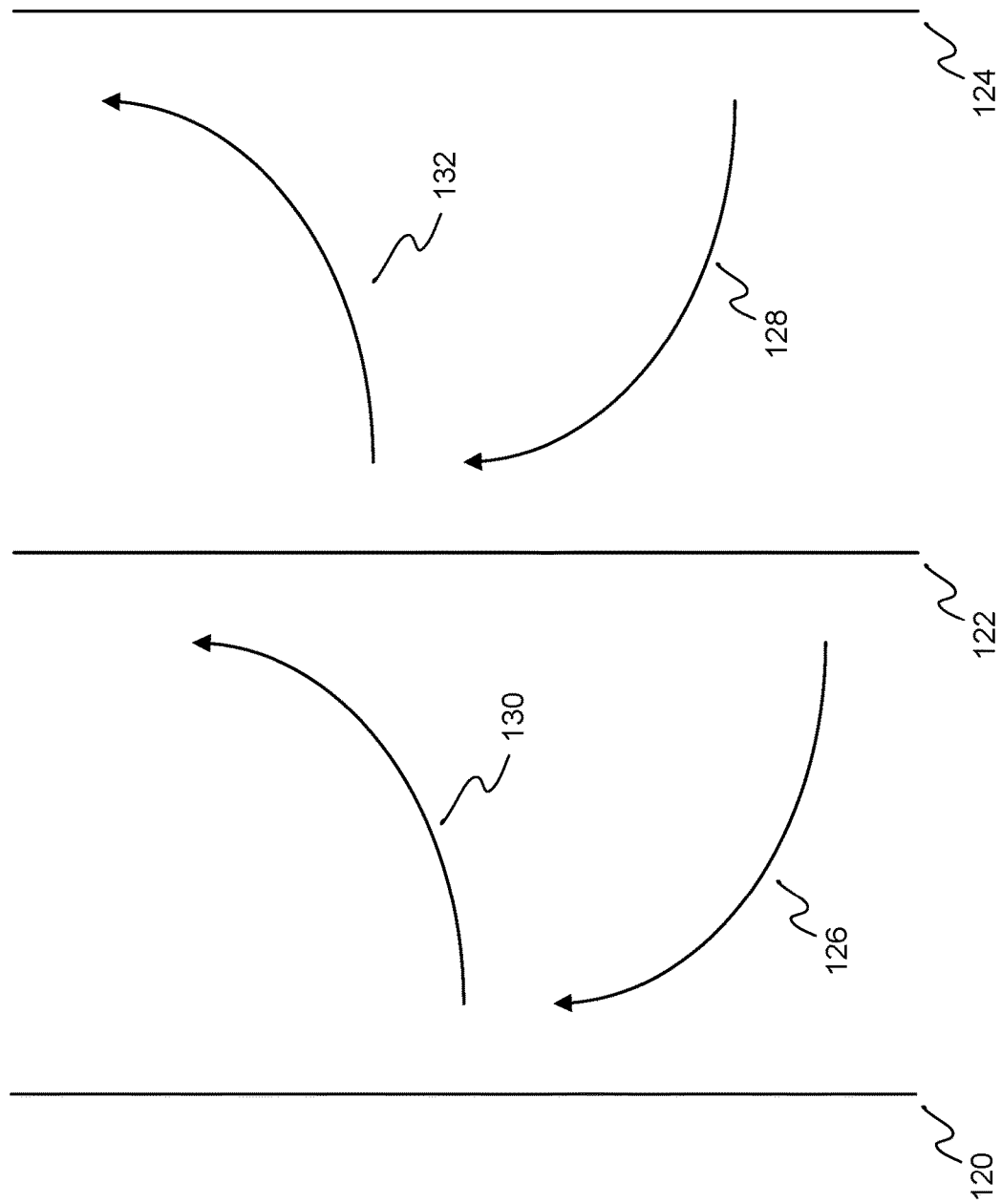
FIG. 7 illustrates a set of predefined paths and turnoffs for a vehicle attachment of the present disclosure to follow.

FIG. 7 illustrates a set of predefined paths and turnoffs for a vehicle attachment of the present disclosure to follow. A set of predefined paths 120-124 can be adjacent to each other. If there is any indication that an attached vehicle needs to be inspected before moving along one of the predefined paths to a station, the corresponding vehicle attachment can turn off from the predefined path and stop. Thereby, other vehicles on that particular predefined path are not obstructed if a vehicle ahead of it needs to be inspected. For instance, if a vehicle attachment and attached vehicle are on the path 122, the vehicle attachment can veer left via turnoff 126 or veer right via turnoff 132 to stop for further attention. Thereby, the path 122 is unobstructed, allowing for any other vehicles along this path to proceed. Additionally, vehicles along the path 120 can be commanded by a vehicle attachment to veer off 130 and vehicles along the path 124 can be commanded by a vehicle attachment to veer off 128.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

We claim:

1. A vehicle attachment for guiding a vehicle, comprising:
   a magnetic tape sensor for detecting a path indicated by a magnetic tape laid on a ground;
   at least one sensor for detecting obstructions along a detected path;
   a controller configured to steer the vehicle along the predefined path;
   at least one coupling device for attachment to the vehicle;
   at least one caster for maintaining the magnetic tape sensor at a predefined distance from the ground; and
   a vehicle interface system for coupling the controller to at least one electronic control unit of the vehicle;
   wherein the magnetic tape sensor is used to detect magnetism from the magnetic tape that indicates to the vehicle interface system to move the vehicle at a particular speed.

2. The vehicle attachment of claim 1 wherein the at least one sensor is a plurality of LIDARs.

3. The vehicle attachment of claim 2 wherein the plurality of LIDARs comprise a first LIDAR and a second LIDAR, wherein the first LIDAR is configured to detect any obstructions along a floor level and the second LIDAR is configured to detect for any obstructions at a predefined angle relative to the floor level.

4. The vehicle attachment of claim 1 wherein the at least one sensor is a LIDAR having multi-beam capabilities.

5. The vehicle attachment of claim 1 wherein the at least coupling device is a suction cup.

6. The vehicle attachment of claim 1 wherein the at least coupling device is a magnet.

7. The vehicle attachment of claim 1 wherein the at least coupling device has a latch configured to be coupled to a receiver of the vehicle.

8. The vehicle attachment of claim 1 wherein the at least coupling device has a receiver configured to be coupled to a latch of the vehicle.

9. The vehicle attachment of claim 1 wherein the vehicle interface system comprises a data transmission cable, wherein the data transmission cable is coupled to the at least one coupling device, and wherein the data transmission cable is configured to communicatively couple the controller with the at least one electronic control unit.

10. The vehicle attachment of claim 1 wherein the vehicle interface system comprises a wireless communications device, wherein the wireless communications device is configured to communicatively couple the controller with the at least one electronic control unit.

11. The vehicle attachment of claim 10 wherein the wireless communications device is configured to transmit in accordance with a vehicle-to-everything communications protocol.

12. The vehicle attachment of claim 1 further comprising a suspension system, wherein the suspension system is coupled to the caster for shock absorption and to aid in maintaining the magnetic tape sensor the predefined distance from the ground.

13. A vehicle manufacturing system, comprising:
   a vehicle having at least one electronic control unit; and
   a vehicle attachment for guiding the vehicle comprising:
      a magnetic tape sensor for detecting a path indicated by a magnetic tape laid on a ground;
      at least one caster for maintaining the magnetic tape sensor at a predefined distance from the ground;
      a plurality of LIDARs for detecting obstructions along the detected path;
      a controller configured to steer the vehicle along the predefined path; at least one coupling device for attachment to the vehicle; and
      a vehicle interface system for coupling the controller to the at least one electronic control unit;
      wherein the magnetic tape sensor is used to detect magnetism from the magnetic tape that indicates to the vehicle interface system to move the vehicle at a particular speed.

14. The vehicle attachment system of claim 13 wherein the at least coupling device is one or more of a suction cup, a magnet, and/or a latch.

15. The vehicle attachment system of claim 13 wherein the vehicle interface system comprises a data transmission cable, wherein the data transmission cable is coupled to the at least one coupling device, and wherein the data transmission cable is configured to communicatively couple the controller with the at least one electronic control unit.

16. The vehicle attachment system of claim 13 wherein the vehicle interface system comprises a wireless communications device and wherein the wireless communications device is configured to communicatively couple the controller with the at least one electronic control unit.

17. The vehicle attachment system of claim 13 wherein the vehicle attachment further comprises a suspension system and wherein the suspension system is coupled to the caster for shock absorption and to aid in maintaining the magnetic tape sensor at the predefined distance from the ground.

18. The vehicle attachment system of claim 13 wherein the vehicle comprises a CAN bus, and wherein the vehicle is configured to receive steering commands from the vehicle attachment via the CAN bus.

* * * * *